United States Patent
Hunt et al.

(10) Patent No.: US 10,161,551 B2
(45) Date of Patent: Dec. 25, 2018

(54) QUICK-CONNECTOR

(71) Applicants: Mitchell W. Hunt, Durand, MI (US); Matthew D. Lutzke, Clarkston, MI (US); Richard E. Geist, Southfield, MI (US)

(72) Inventors: Mitchell W. Hunt, Durand, MI (US); Matthew D. Lutzke, Clarkston, MI (US); Richard E. Geist, Southfield, MI (US)

(73) Assignee: A. RAYMOND ET CIE (FR)

( * ) Notice: Subject to any disclaimer, the term of this patent is extended or adjusted under 35 U.S.C. 154(b) by 274 days.

(21) Appl. No.: 14/795,371

(22) Filed: Jul. 9, 2015

(65) Prior Publication Data

US 2017/0009921 A1    Jan. 12, 2017

(51) Int. Cl.
*F16L 37/088* (2006.01)
*F16L 37/091* (2006.01)

(52) U.S. Cl.
CPC ......... *F16L 37/0915* (2016.05); *F16L 37/088* (2013.01)

(58) Field of Classification Search
CPC .............................. F16L 37/0915; F16L 37/088
See application file for complete search history.

(56) References Cited

U.S. PATENT DOCUMENTS

| 1,440,207 | A |   | 12/1922 | Burns |
|---|---|---|---|---|
| 2,585,453 | A |   | 2/1952 | Gallagher et al. |
| 2,755,109 | A |   | 7/1956 | Risley |
| 4,586,734 | A | * | 5/1986 | Grenier ................... B25B 27/10 285/340 |
| 4,889,368 | A | * | 12/1989 | Laipply ................. F16L 37/088 285/18 |
| 5,292,157 | A |   | 3/1994 | Rubichon |
| 5,328,215 | A |   | 7/1994 | Grenier |
| 5,455,995 | A |   | 10/1995 | Pool |
| 5,603,530 | A |   | 2/1997 | Guest |
| 5,603,532 | A |   | 2/1997 | Guest |
| 5,779,284 | A |   | 7/1998 | Guest |

(Continued)

FOREIGN PATENT DOCUMENTS

| CN | 201237049 Y | 5/2009 | |
|---|---|---|---|
| DE | 3905722 A1 * | 7/1990 | .......... F16L 37/0925 |

(Continued)

*Primary Examiner* — David Bochna
*Assistant Examiner* — James A Linford
(74) *Attorney, Agent, or Firm* — Dickinson Wright PLLC

(57) ABSTRACT

A quick-connector connecting a first pipe and a second pipe. The quick-connector includes a housing that extends about a first axis and defines a bore that extends axially therethrough. A grab ring is disposed in the bore of the housing and includes a body that extends about and along the first axis between a first end and a second end and defines a passage that extends between the first and second ends for receiving one of the first or second pipes. A plurality of protrusions extend from the body in the passage for clamping against the received pipe to prevent the received pipe from being axially removed from the passage. A plurality of hinges are spaced from one another about the body for allowing the body to uniformly and circumferentially flex about the hinges relative to the first axis when the first or second pipe is received in the passage.

15 Claims, 8 Drawing Sheets

(56) References Cited

U.S. PATENT DOCUMENTS

| | | |
|---|---|---|
| 5,833,277 A | 11/1998 | Reinert et al. |
| 5,957,509 A | 9/1999 | Komolrochanapom |
| 2007/0075542 A1 | 4/2007 | Glaze et al. |
| 2008/0238088 A1* | 10/2008 | Webb .................. F16L 37/0915 285/39 |
| 2009/0140514 A1 | 6/2009 | Guest |
| 2011/0089684 A1* | 4/2011 | Schutte ............... F16L 37/0915 285/305 |
| 2011/0140417 A1* | 6/2011 | Kluss .................. F16L 37/0915 285/345 |
| 2013/0168959 A1* | 7/2013 | Turk ..................... F16L 19/061 285/342 |
| 2014/0021719 A1 | 1/2014 | Salehi-Bakhtiari et al. |
| 2015/0345684 A1* | 12/2015 | Kujawski, Jr. ... F02M 35/10091 285/86 |

FOREIGN PATENT DOCUMENTS

| | | |
|---|---|---|
| EP | 0304346 A2 | 2/1989 |
| JP | 2008008457 A | 1/2008 |
| WO | 9703314 A1 | 1/1997 |
| WO | 0036327 A1 | 6/2000 |

\* cited by examiner

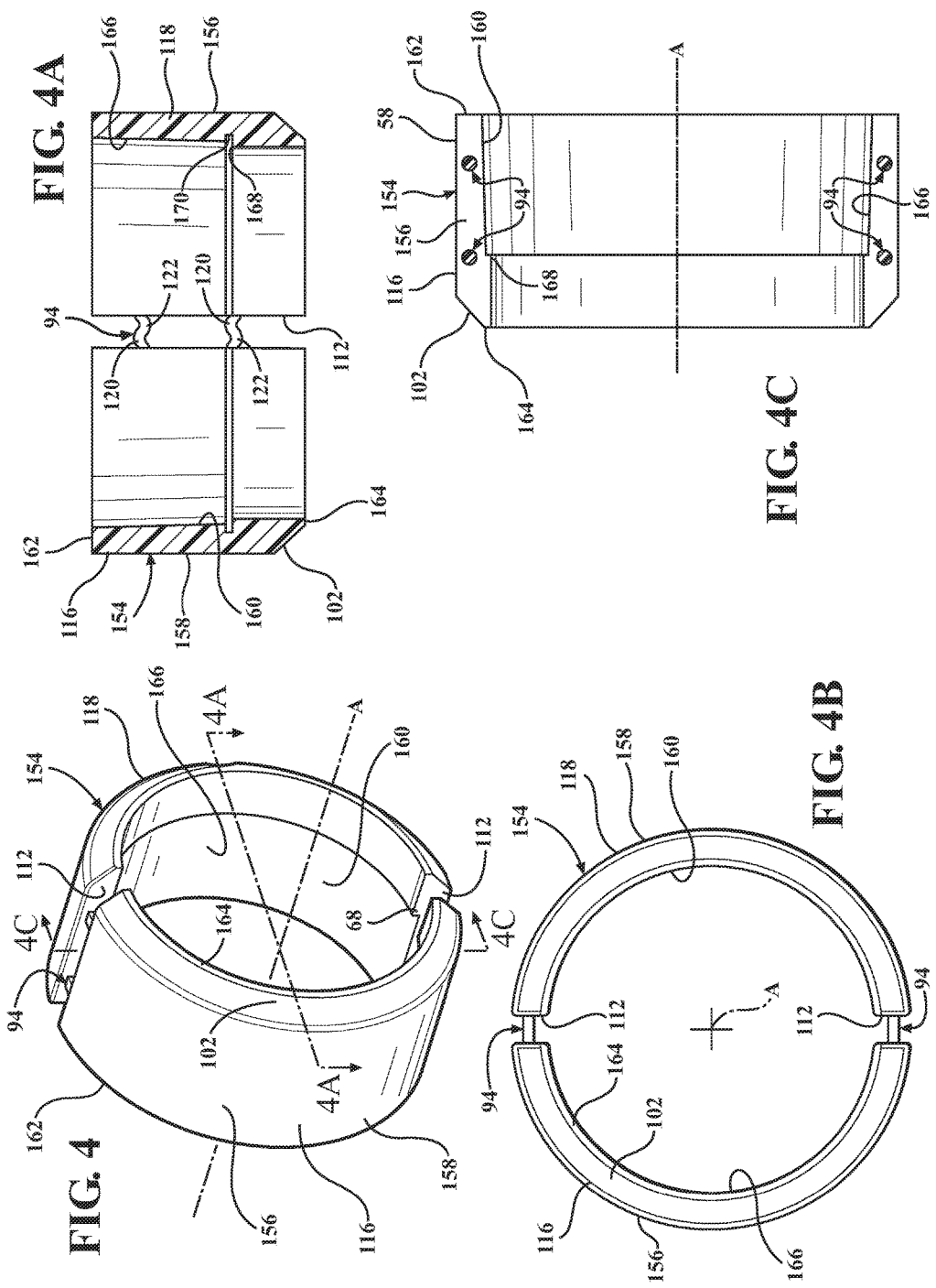

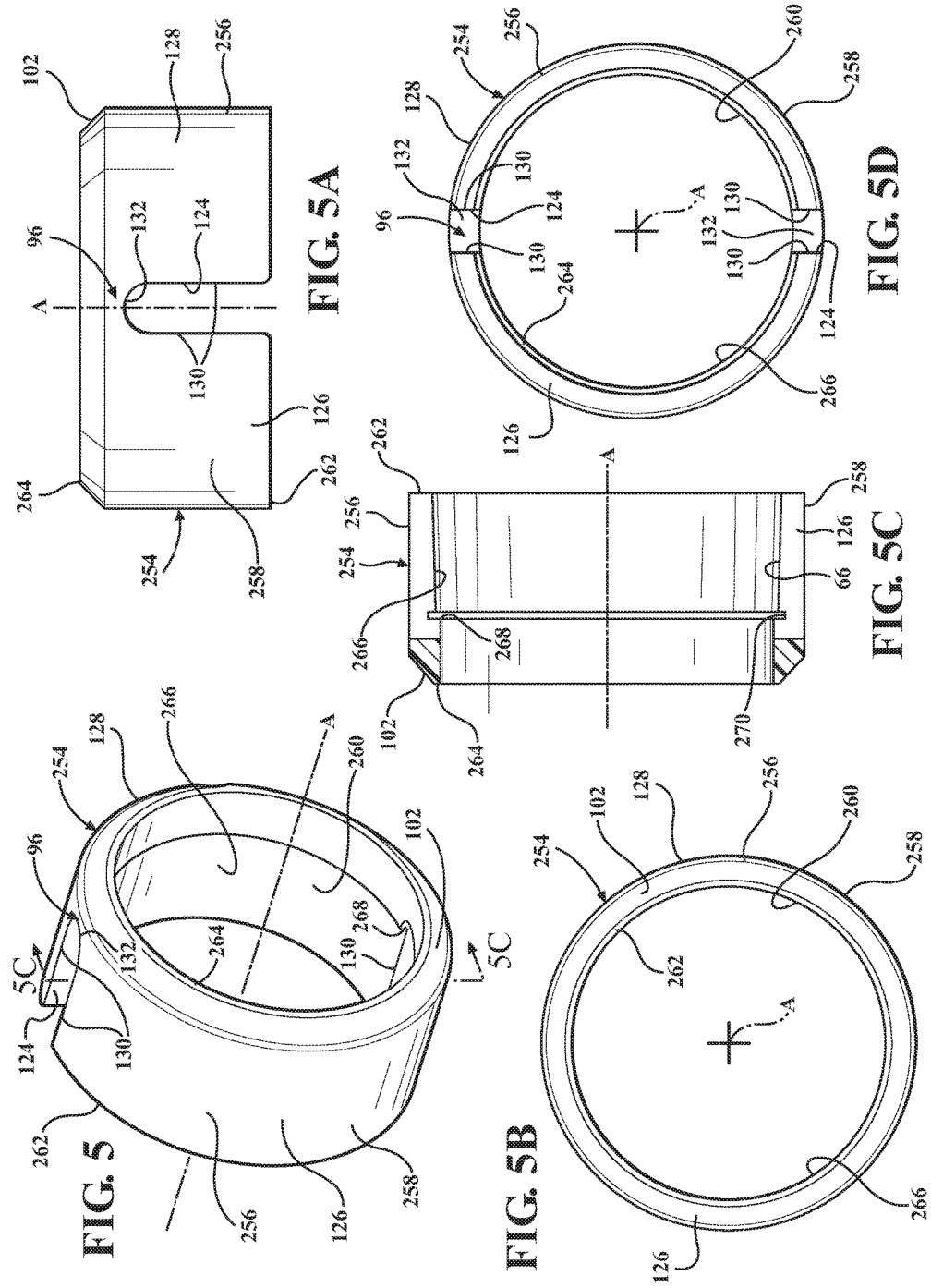

QUICK-CONNECTOR

BACKGROUND OF THE INVENTION

1. Field of the Invention

A quick-connector for establishing fluid communication between a first pipe and a second pipe.

2. Description of the Prior Art

Quick-connectors are utilized in numerous fields, including the automotive industry, for quickly connecting and establishing fluid communication between first and second pipes. An example of a quick-connector is disclosed in U.S. Patent Application Publication No. US 2013/0168959 to Marc Timothy Turk which includes a housing that extends about and along a first axis and defines a bore that extends axially therethrough. A grab ring is disposed in the bore of the housing and includes a body that extends about and along the first axis between a first end and a second end. The body defines a passage that extends between the first and second ends for receiving a pipe. A plurality of teeth extend from the body in the passage for clamping against the received pipe to prevent the received pipe from being axially removed from the passage. It is further known for the grab ring to include a hinge that allows the body of the grab ring to be flexed outwardly about the hinge to widen the passage so that it may receive the pipe, as disclosed in U.S. Pat. No. 5,603,532 to John D. Guest.

A known issue with such quick-connectors is that the teeth of the grab ring forcefully engage the pipe during insertion of the pipe into the passage, thus leading to scoring or other damage to the pipe. Although the single hinge loosens some of the teeth relative to the pipe, other teeth remain forcefully engaged against the pipe and thus still damage the pipe. Accordingly, there remains a need for an improved quick-connector that provides a quick and easy connection between pipes that does not damage the pipes.

SUMMARY AND ADVANTAGES OF THE INVENTION

The invention provides for a quick-connector for establishing fluid communication between a first pipe and a second pipe. The quick-connector includes a housing that extends about and along a first axis and defines a bore that extends axially therethrough. A grab ring is disposed in the bore of the housing and includes a body that extends about and along the first axis between a first end and a second end. The grab ring further defines a passage that extends between the first and second ends for receiving one of the first or second pipes. A plurality of protrusions extend from the body in the passage for clamping against the received pipe to prevent the received pipe from being axially removed from the passage. A plurality of hinges are spaced from one another about the body for allowing the body to flex circumferentially about the hinges when the first or second pipe is received in the passage, thereby more uniformly distributing the clamping forces on the received pipe by the plurality of protrusions. This prevents scoring of the pipe during insertion of the pipe into the passage of the grab ring.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a perspective view of a second exemplary embodiment of a grab ring of the quick-connector according to an aspect of the disclosure;

FIG. 4A is a side cross-sectional view of the grab ring of FIG. 4 taken along line 4A-4A of FIG. 4;

FIG. 4B is a front view of the grab ring of FIG. 4;

FIG. 4C is a side cross-sectional view of the grab ring of FIG. 4 taken along line 4C-4C of FIG. 4;

FIG. 5 is a perspective view of a third exemplary embodiment of a grab ring of the quick-connector according to an aspect of the disclosure;

FIG. 5A is a top view of the grab ring of FIG. 5;

FIG. 5B is front view of the grab ring of FIG. 5;

FIG. 5C is a side cross-sectional view of the grab ring of FIG. 5 taken along line 5C-5C of FIG. 5;

FIG. 5D is a back view of the grab ring of FIG. 5;

DESCRIPTION OF THE ENABLING EMBODIMENTS

Figure 1:
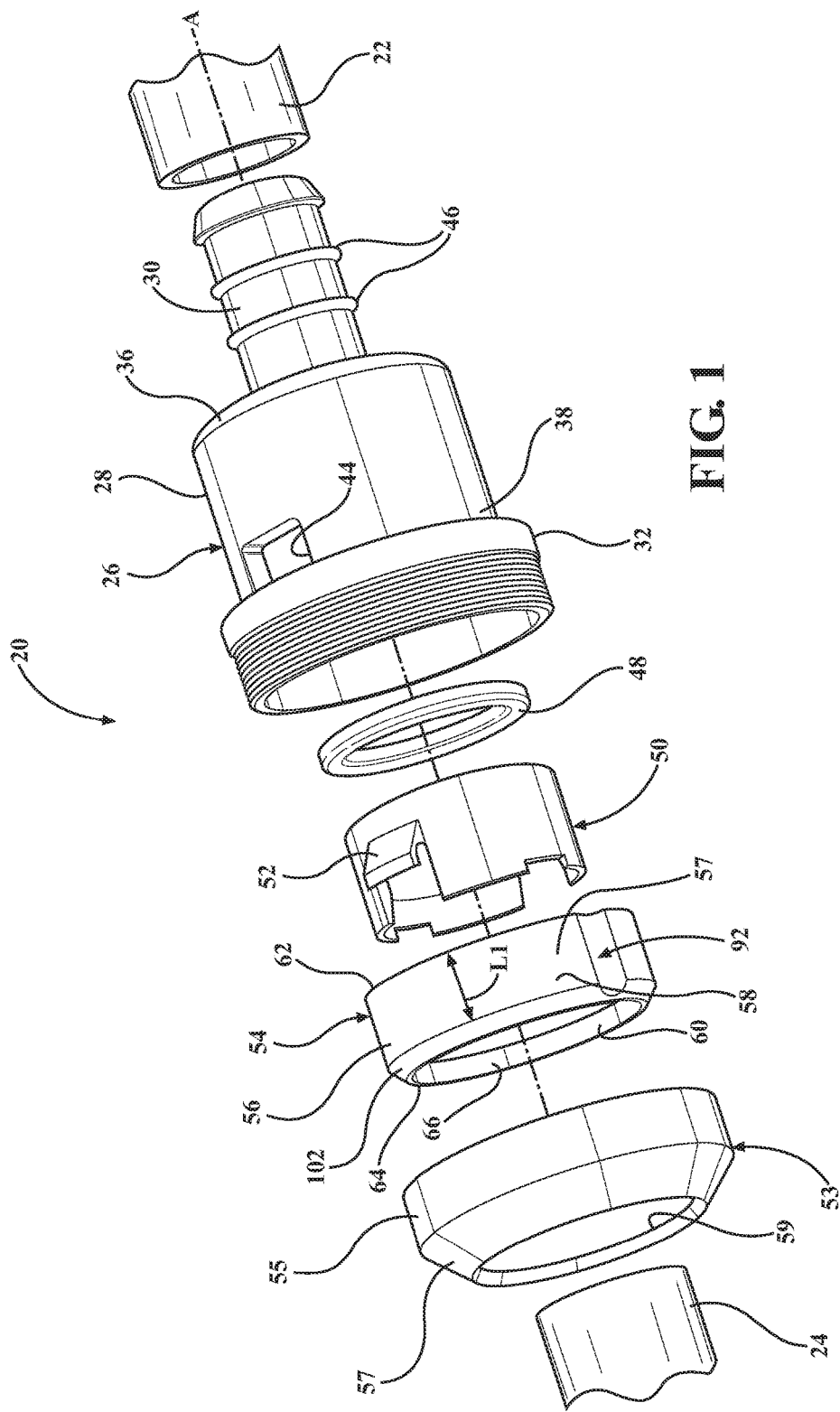
FIG. 1 is a perspective exploded view of a quick-connector according to an aspect of the disclosure.

Referring to the figures, wherein like numerals indicate corresponding parts throughout the several views, a quick-connector 20 is generally shown for establishing fluid communication between a first pipe 22 and a second pipe 24. It should be appreciated that the term "pipe" as used herein may encompass various types of pipes, tubes, conduits and the like. As best presented in FIGS. 1 and 1A, the quick-connector 20 includes a housing 26 that extends about and along a first axis A and includes a base segment 28, a fitting segment 30, and a shoulder segment 32. The housing 26 further defines a bore 34 that extends axially therethrough. As will be explained in greater detail below, the first pipe 22 is connected to the housing 26 by being fitted about the fitting segment 30 and the second pipe 24 is connected to the housing 26 inside of the bore 34.

Figure 1A:
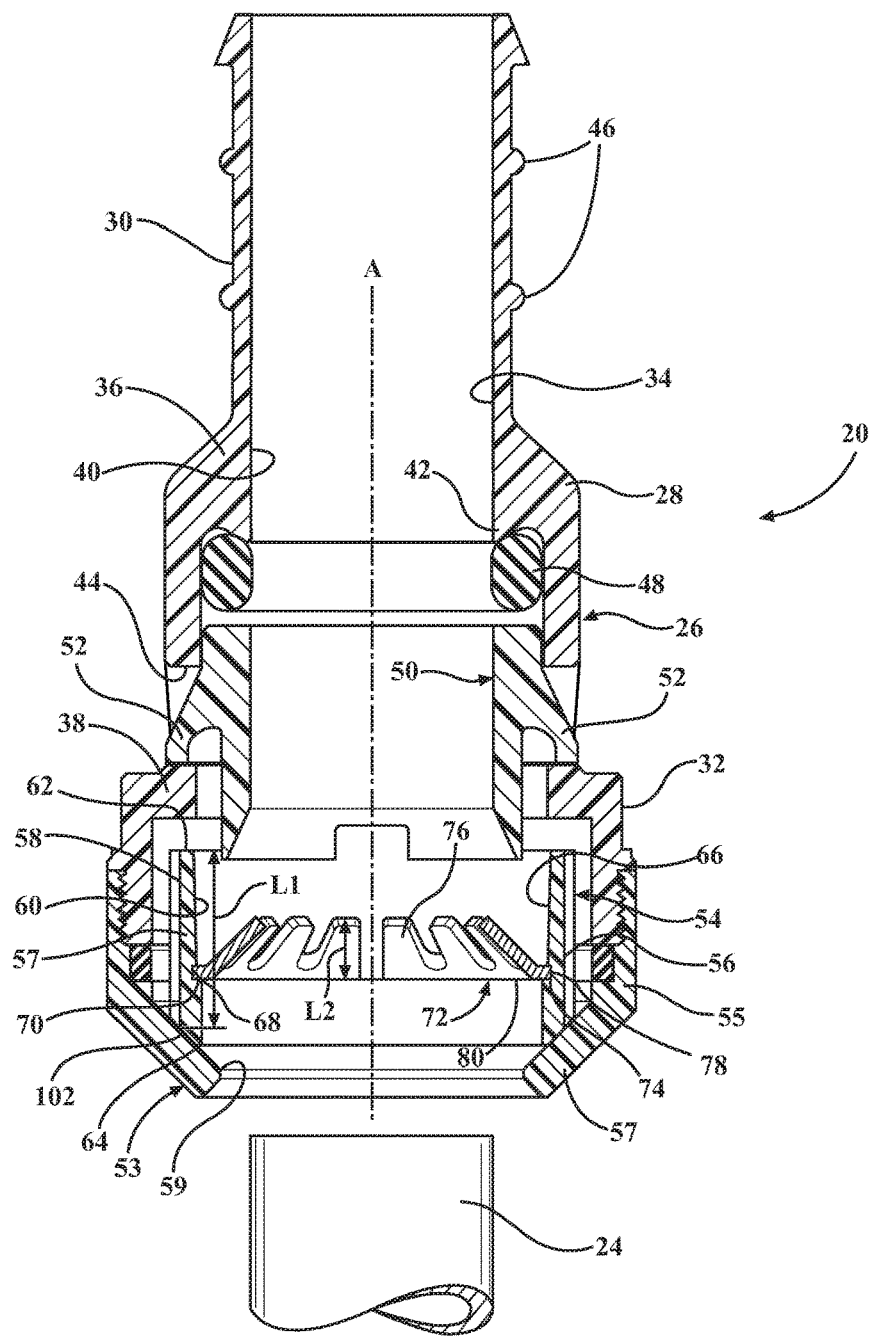
FIG. 1A is a side cross-sectional view of the quick-connector.

As best shown in FIG. 1A, the base segment 28 of the housing 26 is generally tube-shaped and extends axially between a first portion 36 and a second portion 38 and defines an inner surface 40 that partially defines the bore 34. The inner surface 40 presents an annular ring seat 42 that extends radially inwardly toward the first axis A at the first portion 36. The base segment 28 further defines a pair of generally rectangular-shaped locking channels 44 that extend radially inwardly into the bore 34 on diametrically opposite sides of the first axis A at an axial location that is adjacent to the second portion 38. It should be appreciated that more or fewer locking channels 44 could be defined by the base segment 28 and the locking channels 44 could be positioned at other locations on the base segment 28 without departing from the scope of the subject disclosure.

The fitting segment 30 of the housing 26 is generally tube-shaped and extends axially from the first portion 36 of the base segment 28 for being received by the first pipe 22 for connecting the housing 26 to the first pipe 22. A plurality of barbs 46 extend radially outwardly from the fitting segment 30 and annularly about the first axis A for frictionally securing the first pipe 22 to the fitting segment 30. It should be appreciated that other types of connection mechanisms could be utilized to connect the housing 26 to the first pipe 22. For example, as an alternative to utilizing the fitting segment 30 to connect to the first pipe 22, an additional housing that is configured the same as housing 26 (without a fitting segment 30) could be utilized. The additional housing could be integrally connected to, and extend away from first portion 36 of the base segment 28 of housing 26.

The shoulder segment 32 of the housing 26 extends axially from the second portion 38 of the base segment 28. The shoulder segment 32 is generally tube-shaped and has a larger diameter than the base segment 28. It should be appreciated that the shoulder segment 32 could have other shapes and sizes without departing from the scope of the subject disclosure.

An o-ring 48 is disposed in the bore 34 in the base segment 28 and axially abuts the ring seat 42 for establishing a sealed relationship between the housing 26 and the second pipe 24 when the second pipe 24 is received within the bore 34 of the housing 26. Furthermore, a generally tube-shaped lock washer 50 is disposed in the bore 34 of the housing 26 about the first axis A at an axial location that is adjacent to the o-ring 48. The lock washer 50 secures the o-ring 48 in place by blocking axial movement of the o-ring 48 relative to the housing 26. A pair of tabs 52 extend radially outwardly from the lock washer 50 and are received by the locking channels 44 of the base segment 28 of the housing 26 for preventing axial movement of the lock washer 50 relative to the housing 26. It should be appreciated that more or fewer tabs 52 could be utilized, and the tabs 52 could extend from other locations of the lock washer 50 without departing from the scope of the subject disclosure.

As best illustrated in FIGS. 1 and 1A, a nose piece 53 extends about the first axis A and is removeably secured to the shoulder segment 32 of the housing 26. The nose piece 53 has a cylinder portion 55 and a tapered portion 57. The cylinder portion 55 is generally tube-shaped and is secured to the shoulder segment 32 of the housing 26. In the exemplary embodiment, the cylinder portion 55 is secured to the shoulder segment 32 using a threaded connection, however, other attachment methods could be utilized such as, but not limited to, a snap-fit type connection without departing from the scope of the subject disclosure. The tapered portion 57 extends from the cylinder portion 55 and is tapered radially inwardly toward the first axis A. The nose piece 53 further defines an opening 59 that extends axially therethrough for receiving the second pipe 24.

A grab ring 54, 154, 254 is disposed in the bore 34 in the shoulder portion of the housing 26 about the first axis A. The grab ring 54, 154, 254 includes a body 56 that has a generally tube shaped portion 57 that extends along a first axial length $L_1$ and presents an outside surface 58 and an inside surface 60. The body 56 extends axially between a first end 62 and a second end 64 with the first end 62 disposed adjacent to the second portion 38 of the base segment 28 of the housing 26. The body 56 further defines a passage 66 that extends axially therethrough for receiving the second pipe 24.

As best illustrated in FIG. 1A, the inside surface 60, 160, 260 of the body 56, 156, 256 of the grab ring 54, 154, 254 presents an annular notch 68, 168, 268 that extends radially inwardly toward the first axis A at an axial location that is adjacent to the first end 62, 162, 262 of the body 56, 156, 256. Furthermore, the inside surface 60, 160, 260 of the body 56, 156, 256 defines at least one detent 70, 170, 270 axially above the notch 68, 168, 268 that extends therein.

Figure 2:
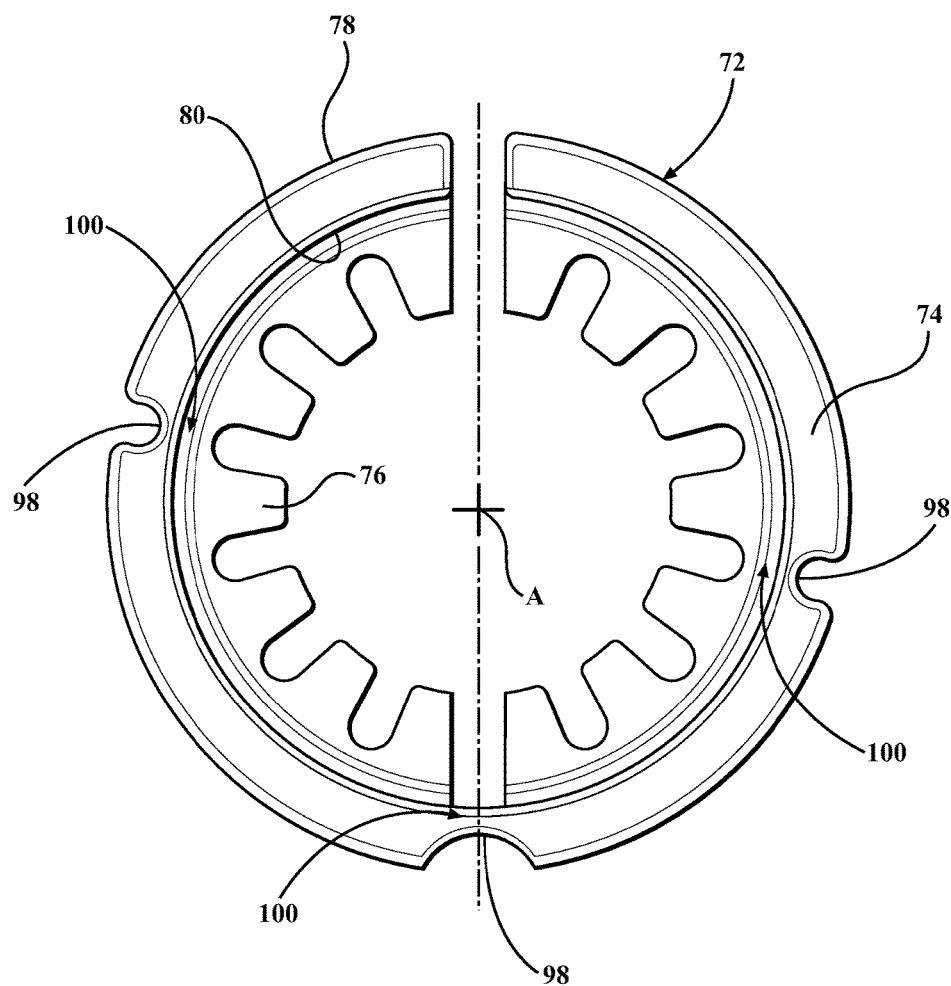
FIG. 2 is an end view of a tooth insert of the quick-connector.

As further illustrated in FIG. 1A, the grab ring 54, 154, 254 also includes a tooth insert 72 that is connected to the body 56, 156, 256 inside the passage 66, 166, 266 of the body 56, 156, 256. As best shown in FIG. 2, the tooth insert 72 has a periphery 74 and a plurality of protrusions 76. The periphery 74 is generally ring-shaped and includes an outer rim 78 and an inner rim 80. With reference back to FIG. 1A, the outer rim 78 is received by the detent 70, 170, 270 and is supported axially by the notch 68, 168, 268 of the body 56, 156, 256 of the grab ring 54, 154, 254. In the exemplary embodiments, the plurality of protrusions 76 include at least three teeth 76 that extend from the inner rim 80 generally axially toward the first end 62, 162, 262 of the grab ring 54, 154, 254 and are tapered radially inwardly toward the first axis A. Once the second pipe 24 has been inserted into the passage 66, 166, 266 of the grab ring 54, 154, 254, the teeth 76 of the tooth insert 72 clamp against the second pipe 24. It should be appreciated that the periphery 74 of the tooth insert 72 could have other shapes without departing from the scope of the subject disclosure. It should further be appreciated that more protrusions 76 could be utilized and that the protrusions 76 could have various shapes and sizes without departing from the scope of the subject disclosure.

As best presented in FIG. 1A, the body 56 of the grab ring 54, 154, 254 further presents a compression surface 102 at the second end 64 that tapers radially inwardly between the outside and inside surfaces 58, 60. The compression surface 102 engages the tapered portion 57 of the nose piece 53 for forcing the body 56 to flex inwardly during axial movement of the grab ring 54, 154, 254 against the tapered portion 57 of the nose piece 53. Such movement causes the teeth 76 to tighten about, i.e., "grab", the second pipe 24 to prevent the second pipe 24 from being removed from the housing 26. Said another way, the abutment of the tapered compression surface 102 and the tapered portion 57 of the nose piece 53 allows the teeth 76 of the tooth insert 72 to be tightened about the second pipe 24 during axial pulling of the second pipe 24 away from the housing 26, thereby preventing the second pipe 24 from being removed from the grab ring 54. The protrusions 76 have a second axial length $L_2$ that is less than the first axial length $L_1$.

Figure 3:
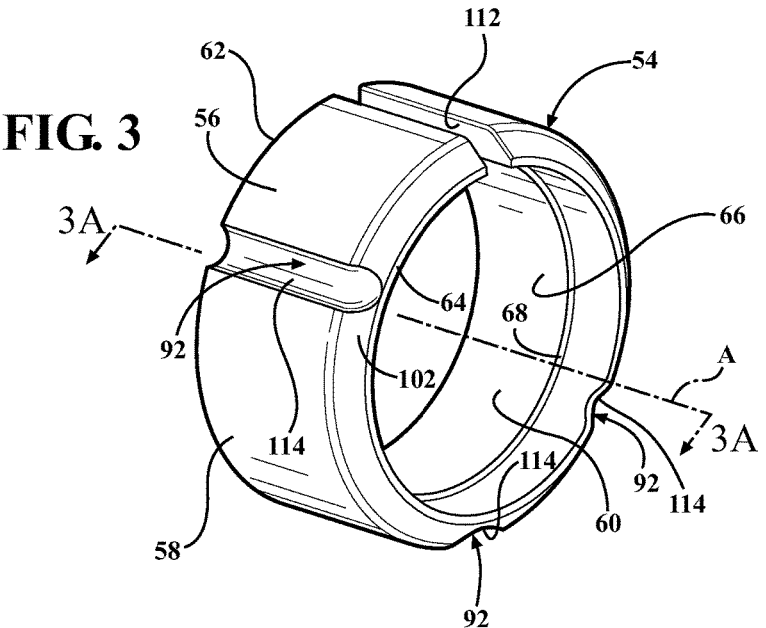
FIG. 3 is a perspective view of a first exemplary embodiment of a grab ring of the quick-connector according to an aspect of the disclosure.
Figure 3A:
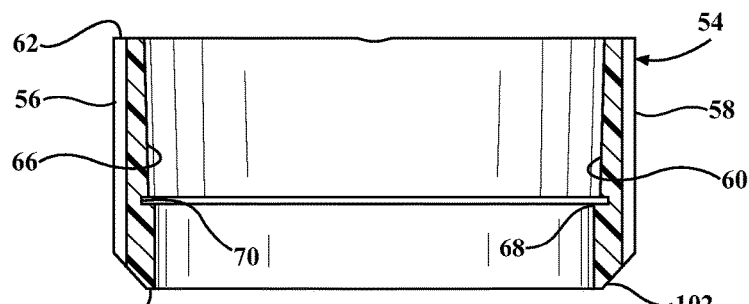
FIG. 3A is a side cross-sectional view of the grab ring of FIG. 3 taken along line 3A-3A of FIG. 3.

As best presented in FIGS. 3, 4 and 5, the body 56, 156, 256 of the grab ring 54, 154, 254 includes a plurality of hinges 92, 94, 96 that are circumferentially spaced from one another about the body 56, 156, 256 for allowing the body 56, 156, 256 to flex circumferentially about the hinges 92, 94, 96 for tightening and loosening the body 56, 156, 256 about the second pipe 24. It should be appreciated that having a plurality of spaced hinges 92, 94, 96 more uniformly distributes the clamping forces on the second pipe 24 by the plurality of protrusions 76. This prevents scoring of the second pipe 24 during insertion of the second pipe 24 into the passage 66, 166, 266 of the body 56, 156, 256, which is a known problem with prior art quick-connectors which utilize only a single hinge.

As best presented in FIG. 2, the outer rim 78 of the periphery 74 of the tooth insert 72 defines a plurality of grooves 98 that extend radially inwardly from the outer rim 78 toward the inner rim 80, each in alignment with one of the hinges 92, 94, 96. A tooth pivot 100 is defined between each of the grooves 98 and the inner rim 80 of the periphery 74 for allowing the tooth insert 72 to flex circumferentially about the tooth pivots 100 with the body 56, 156, 256 during flexing of the body 56, 156, 256 about the hinges 92, 94, 96, thereby aiding in uniformly distributing the clamping forces on the received pipe 24 by the plurality of protrusions 76. Said another way, the tooth pivots 100 function the same as the hinges 92, 94, 96 of the body 56, 156, 256 and flex in synchronization with the hinges 92, 94, 96 to aid in uniformly distributing the clamping forces on the received pipe 24. It should be appreciated that the grooves 98 could alternatively be defined by the inner rim 80 of the periphery 74 or by both the outer and inner rims 78, 80.

In the exemplary embodiments, the tooth insert 72 is made of a metal material and the grab ring 54, 154, 254 is made of an organic polymer material. Further, the grab ring 54, 154, 254 is overmolded about the periphery 74 of the tooth insert 72. It should be appreciated that other materials could be utilized and other molding/manufacturing techniques can be used to form the tooth insert 72 and grab ring 54, 154, 254 without departing from the scope of the subject disclosure.

Figure 3B:
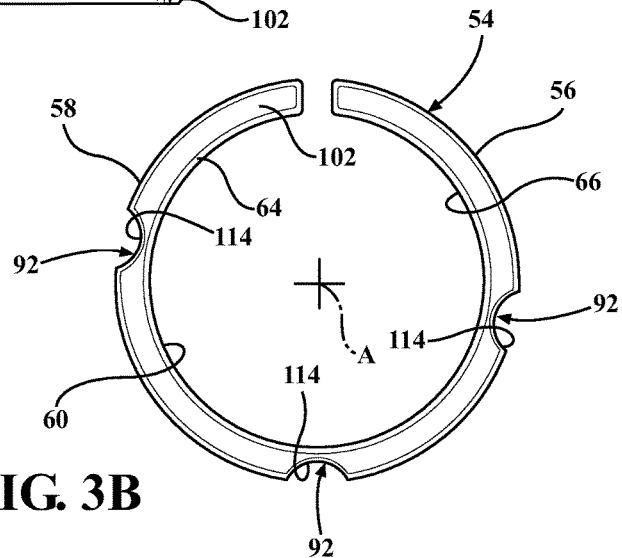
FIG. 3B is a front view of the grab ring of FIG. 3.

As best presented in FIGS. 3-3B, in the first exemplary embodiment of the grab ring 54 the body 56 defines a plurality of arc-shaped niches 114 that each extend radially inwardly from the outside surface 58 and are circumferentially spaced from one another. In the presented arrangement, the plurality of hinges 92 includes three niche hinges 92 that are each disposed between the inside surface 60 of the body 56 and one of the niches 114. It should be appreciated that the niches 114 could alternatively be defined by the inside surface 60 of the body 56, thus defining the niche hinges 92 between the outside surface 58 and the niches 114. Further, the niches 114 could be defined by a combination of the outside and inside surfaces 58, 60 of the body 56. The body 56 of the grab ring 54 further defines a generally rectangular-shaped gap 112 that extends radially through the body 56 for providing space to allow the body 56 to flex inwardly at the gap 112.

As best presented in FIGS. 4-4C, in the second exemplary embodiment of the grab ring 154 a plurality of gaps 112 are defined by the body 156 and separate the body into a plurality of members 116, 118. In the presented arrangement, the plurality of gaps 112 include a pair of gaps 112 on diametrically opposite sides of the first axis A that separate the grab ring 154 into a first member 116 and a second member 118, with the first and second members 116, 118 being mirror images of one another. The plurality of hinges 94 includes a plurality of biasing hinges 94 that extend between the plurality of members 116, 118 in each of the gaps 112. As best shown in FIG. 4A, each of the biasing hinges 94 comprises a spring of metal material and is shaped to include at least one peak 120 and at least one valley 122, however, it should be appreciated that the biasing hinges 94 could be made of other materials and could take other shapes without departing from the scope of the subject disclosure. It should further be appreciated that more or fewer biasing hinges 94 could be utilized without departing form the scope of the subject disclosure.

As best presented in FIGS. 5-5D, in a third exemplary embodiment of the grab ring 254, the body 256 of the grab ring 254 defines a plurality of slots 124 that each extend axially from the first end 262 of the grab ring 254 and divide the body into a plurality of components 126, 128. In the presented arrangement, the plurality of slots 124 includes a pair of slots 124 on diametrically opposite sides of the first axis A and divide the body 256 into a first component 126 and a second component 128, with the first and second components 126, 128 being mirror images of one another. Each of the slots 124 are defined by a pair of linear portions 130 that extend axially in spaced and parallel relationship with one another, and an arc portion 132 that extends between the linear portions 130 adjacent to the second end 264 of the grab ring 254. The plurality of hinges 96 includes a plurality of mouth hinges 96, each defined between the second end 264 of the body 256 and one of the arc portions 132. The mouth hinges 96 allow the components 126, 128 of the body 256 to pivot toward and away from one another about the mouth hinges 96. Said another way, the mouth hinges 96 allow the linear portions 130 of the slots 124 to pivot toward and away from one another during pivoting about the mouth hinge 96.

Figure 6:
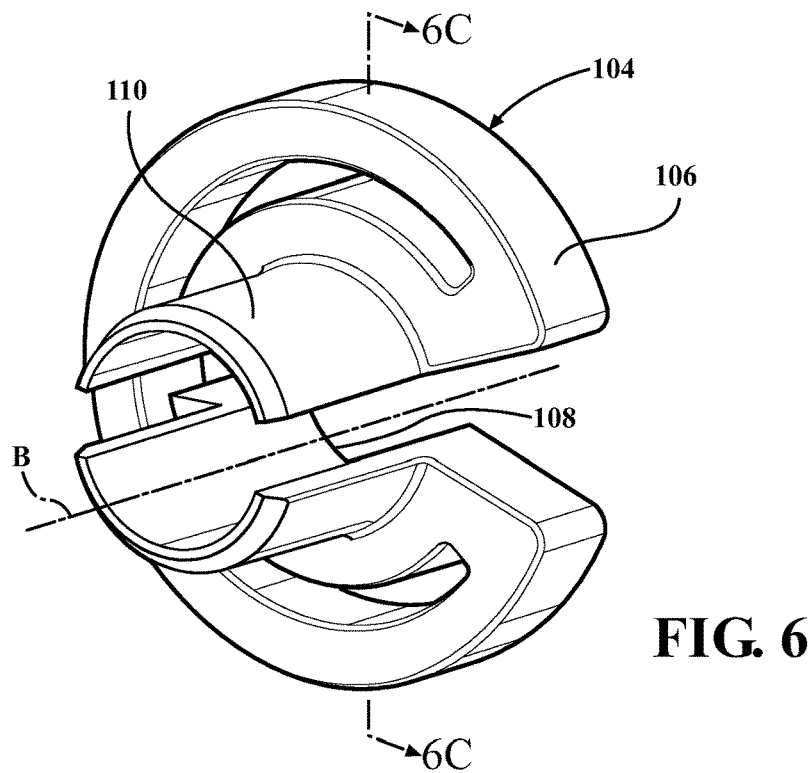
FIG. 6 is a perspective view of a release tool according to an aspect of the disclosure.
Figure 6A:
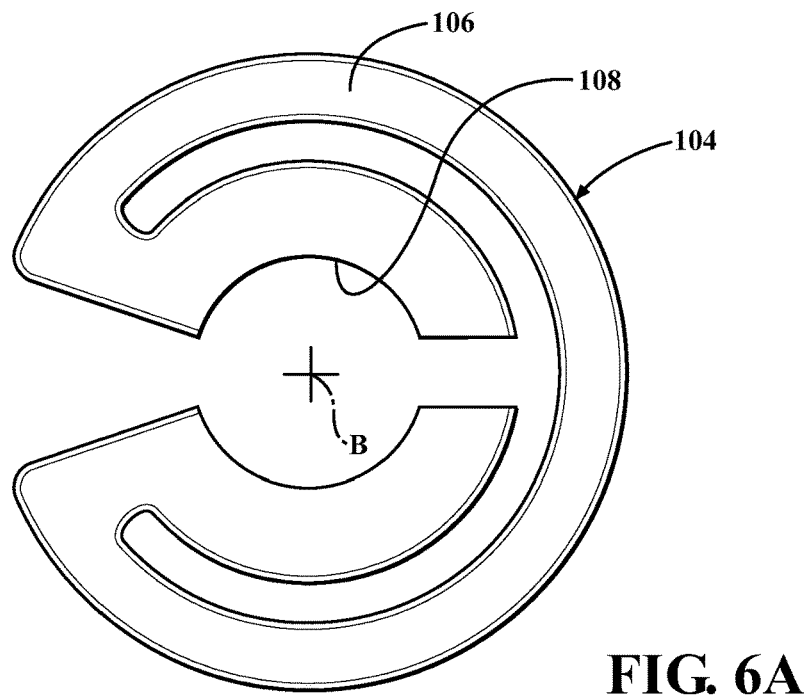
FIG. 6A is a back view of the release tool of FIG. 6.
Figure 6B:
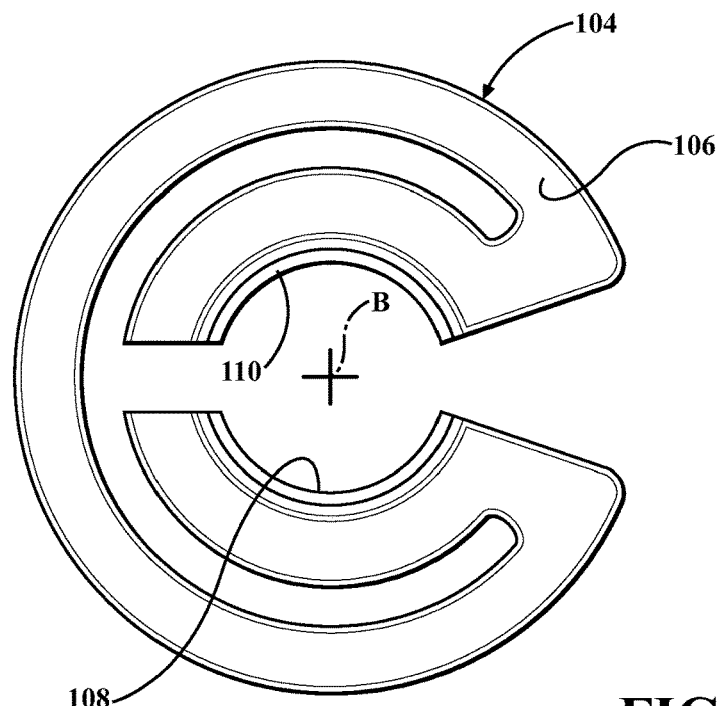
FIG. 6B is a front view of the release tool of FIG. 6.
Figure 6C:
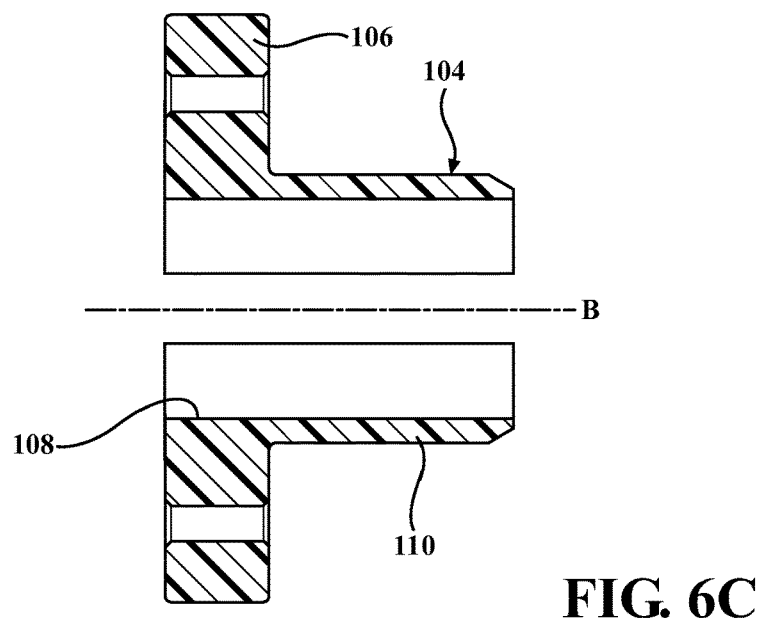
FIG. 6C is a side cross-sectional view of the release tool of FIG. 6 taken along line 6C-6C of FIG. 6.

With reference to FIGS. 6-6D, a release tool 104 is configured to mate with the second pipe 24 for releasing the second pipe 24 from the passage 66 of the grab ring 54 while preventing the teeth 76 from damaging the second pipe 24 during removal of the second pipe 24 from the passage 66. The release tool 104 includes a generally C-shaped foundation portion 106 that defines an aperture 108 that extends along a tool axis B. The release tool 104 further includes a pair of arc-shaped projections 110 that extend parallel to the tool axis B from the foundation portion 106, about the aperture 108 for being clamped about the first pipe 22 or second pipe 24. This clamping shields the first or second pipe 22, 24 from the protrusions 76 during removal of the first or second pipe 22, 24 from the passage 66. It should be appreciated that the foundation portion 106 and projections 110 could have other shapes without departing from the scope of the subject disclosure.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A quick-connector for establishing fluid communication between a first pipe and a second pipe including: a housing extending about and along a first axis and defining a bore extending axially therethrough; a grab ring disposed in said bore of said housing and including a body having an outside surface and an inside surface and extending about and along said first axis between a first end and a second end and defining a passage extending between said first and second ends for receiving one of the first or second pipes; said body of said grab ring having a tube shaped portion extending axially along a first axial length; a ring-shaped tooth insert being internally recessed and retained in an internal groove of said body of said grab ring, said ring-shaped tooth insert including a plurality of protrusions extending radially inwardly from a location adjacent to said inside surface of said body along said tube shaped portion and into said passage for clamping against the received first or second pipe to prevent the received pipe from being axially removed from said passage; said protrusions having a second axial length being less than said first axial length; said outside surface of said body defining a plurality of niches extending radially inwardly toward said inside surface and extending axially along said first axial length of said tube shaped portion to define a hinge radially between said inside surface of said body and each of said niches, respectively, for allowing said body to flex circumferentially about said hinges when the first or second pipe is received in said passage to more uniformly distribute the clamping forces on the received pipe by said plurality of protrusions.

2. A quick-connector as set forth in claim 1 wherein each of said plurality of niches have an arc shaped-cross section when taken along a plane extending perpendicular to said first axis.

3. A quick-connector as set forth in claim 2 wherein said plurality of niches include three niches spaced from one another about said outside surface of said body, and said plurality of hinges includes three niche hinges each disposed between said inside surface of said body and one of said three niches.

4. A quick-connector as set forth in claim 3 wherein said body defines at least one gap extending therethrough between said inside and outside surfaces and spaced from said niches to provide space for said body to move within said gap during said circumferential flexing.

5. A quick-connector as set forth in claim 1 wherein said tooth insert has a periphery connected to said internal groove of said body, and said plurality of protrusions extending extend inwardly from said periphery.

6. A quick-connector as set forth in claim 5 wherein said periphery extends annularly and said plurality of protrusions comprises at least three teeth being spaced circumferentially from one another about said periphery.

7. A quick-connector as set forth in claim 6 wherein said teeth extend generally axially toward said first end of said body and are tapered radially inwardly toward said first axis.

8. A quick-connector as set forth in claim 5 wherein said outer rim of said periphery defines a plurality of grooves extending toward said inner rim each in alignment with one of said hinges to define a plurality of tooth pivots each between one of said grooves and said inner rim of said periphery for allowing said tooth insert to flex circumferentially about said tooth pivots with said body during flexing of said body about said hinges to aid in uniformly distributing the clamping forces on the received pipe by said plurality of protrusions.

9. A quick-connector as set forth in claim 1 further including a release tool configured to mate with the first or second pipe and release the first or second pipe from said passage of said grab ring while preventing said plurality of protrusions from damaging the first or second pipe.

10. A quick-connector as set forth in claim 9 wherein said release tool includes a foundation portion defining an aperture extending along a tool axis, and said release tool further includes a pair of projections extending parallel to said tool axis from said foundation portion about said aperture for being clamped about the first or second pipe to shield the first or second pipe from said plurality of protrusions during removal of the first or second pipe from said passage of said grab ring.

11. A quick-connector as set forth in claim 1 further including a nose piece connected to said housing and presenting a tapered portion tapering radially inwardly toward said first axis, said body further presenting a compression surface at said second end tapering radially inwardly in engaging relationship with said tapered portion of said nose piece for forcing said body to flex inwardly at said plurality of hinges during axial movement of said grab ring against said tapered portion to tighten said plurality of protrusions about the received pipe and to prevent the received pipe from being removed from said passage of said body.

12. A quick-connector for establishing fluid communication between a first pipe and a second pipe including: a housing extending about and along a first axis and defining a bore extending axially therethrough; a grab ring disposed in said bore of said housing and including a body having an outside surface and an inside surface and extending about and along said first axis between a first end and a second end and defining a passage extending between said first and second ends for receiving one of the first or second pipes; said body of said grab ring having a generally tube shaped portion and a compression surface extending axially from said tube shaped portion and tapering radially inwardly to said second end; a ring-shaped tooth insert being internally recessed and retained in an internal groove of said body, said ring-shaped tooth insert including a plurality of protrusions extending radially inwardly from a location adjacent to said inside surface of said body along said tube shaped portion and into said passage for clamping against the received first or second pipe to prevent the received pipe from being axially removed from said passage; said protrusions having a second axial length being less than said first axial length; said outside surface of said body defining a plurality of niches extending radially inwardly toward said inside surface and extending axially along said tube shaped portion and said compression surface to define a hinge radially between said inside surface of said body and each of said niches, respectively, for allowing said body to flex circumferentially about said hinges when the first or second pipe is received in said passage to more uniformly distribute the clamping forces on the received pipe by said plurality of protrusions.

13. A quick-connector as set forth in claim 12 wherein each of said plurality of niches have an arc shaped-cross section when taken along a plane extending perpendicular to said first axis.

14. A quick-connector for establishing fluid communication between a first pipe and a second pipe including: a housing for connecting to one of the first and second pipes and extending about and along a first axis and defining a bore extending axially therethrough; a grab ring disposed in said bore of said housing and including a body having an outside surface and an inside surface defining an internal groove and extending about and along said first axis between a first end and a second end along an axial length and defining a passage extending between said first and second ends for receiving one of the first or second pipes; a ring-shaped tooth insert being internally recesses and including an annular rim retained in said internal groove of said grab ring and including a plurality of teeth extending radially inwardly from said annular rim for clamping against the received pipe to prevent the received pipe from being axially removed from said passage; said outside surface of said body defining a plurality of niches extending radially inwardly toward said inside surface and extending axially along said axial length of said body to define a hinge radially between said inside surface of said body and each of said niches, respectively, to allow said body to flex circumferentially about said hinges when the first or second pipe is received in said passage to more uniformly distribute the clamping force on the received pipe by said plurality of protrusions.

15. The quick-connector as set forth in claim 14 wherein said annular rim of said tooth insert has an outer surface, and wherein said outer surface defines a plurality of grooves extending radially inwardly toward said protrusions, each in alignment with one of said niches.

\* \* \* \* \*